US008917061B2

(12) United States Patent
Zhu (10) Patent No.: US 8,917,061 B2
(45) Date of Patent: Dec. 23, 2014

(54) SYSTEM AND METHOD FOR BATTERY CELL BALANCING (75) Inventor: Dao-Yi Zhu, Acton, MA (US)

(73) Assignee: Schneider Electric IT Corporation, West Kingston, RI (US)

(*) Notice: Subject to any disclaimer, the term of this patent is extended or adjusted under 35 U.S.C. 154(b) by 790 days.

(21) Appl. No.: 12/562,783

(22) Filed: Sep. 18, 2009

(65) Prior Publication Data
US 2011/0068744 A1  Mar. 24, 2011

(51) Int. Cl.
H02J 7/00 (2006.01)
(52) U.S. Cl.
CPC .................... *H02J 7/0016* (2013.01)
USPC .......................... 320/119; 320/122
(58) Field of Classification Search
USPC .......................................................... 320/116
See application file for complete search history.

(56) References Cited

U.S. PATENT DOCUMENTS

| 5,952,815 | A * | 9/1999 | Rouillard et al. | 320/116 |
|---|---|---|---|---|
| 2004/0135544 | A1 * | 7/2004 | King et al. | 320/116 |
| 2006/0119319 | A1 * | 6/2006 | Sakurai et al. | 320/116 |
| 2008/0197805 | A1 * | 8/2008 | Pellenc | 320/116 |
| 2009/0208821 | A1 | 8/2009 | Kosugi et al. | |

FOREIGN PATENT DOCUMENTS

| CN | 101248364 A | 8/2008 |
|---|---|---|
| EP | 0 652 620 A1 | 5/1995 |
| WO | WO 99/05767 A1 | 2/1999 |

OTHER PUBLICATIONS

Notification of Transmittal of the International Search Report and the Written Opinion of the International Searching Authority for Int'l Application No. PCT/US2010/047496; Date Mailed: Apr. 26, 2011.
International Preliminary Report on Patentability for Int'l Application No. PCT/US2010/047496; Date Mailed: Mar. 29, 2012.

* cited by examiner

*Primary Examiner* — Drew A Dunn
*Assistant Examiner* — Robert Grant
(74) *Attorney, Agent, or Firm* — Hamilton, Brook, Smith & Reynolds, P.C.

(57) ABSTRACT

Without battery cell balancing, voltages of multiple series-connected battery cells may quickly become out of balance, which causes some cells of the battery to deteriorate faster than others, and reduces the life cycle of the battery. Embodiments of the present invention address this problem by providing a system for balanced charging of multiple series-connected battery cells. The system includes resistors that are selectably and electrically coupled in parallel with respective battery cells via activation and deactivation of respective switches. The system also includes a control unit that is configured to determine a battery cell having a lowest voltage among the battery cells, and to activate and deactivate the switches as a function of differences in voltages between the voltage of the lowest battery cell and voltages of each of the other battery cells, thus, providing balanced charging of the multiple series-connected battery cells.

20 Claims, 10 Drawing Sheets

POWER FLOW UNDER NORMAL CONDITIONS

FIG. 1A PRIOR ART

POWER FLOW DURING A LOSS OF POWER

DIFFERENCES IN VOLTAGE FROM LOWEST BATTERY CELL VOLTAGE  730

| | CELL 1 DIFFERENCE | CELL 2 DIFFERENCE | CELL 3 DIFFERENCE | CELL 4 DIFFERENCE |
|---|---|---|---|---|
| T1 | Δ = 0.4 | Δ = 0 | Δ = 0.4 | Δ = 0.3 |
| T2 | Δ = 0.3 | Δ = 0 | Δ = 0.3 | Δ = 0.2 |
| T3 | Δ = 0.2 | Δ = 0 | Δ = 0.2 | Δ = 0.1 |
| T4 | Δ = 0.1 | Δ = 0 | Δ = 0.1 | Δ = 0 |
| T5 | Δ = 0 | Δ = 0 | Δ = 0 | Δ = 0 |

SYSTEM AND METHOD FOR BATTERY CELL BALANCING

BACKGROUND OF THE INVENTION

An uninterruptible power supply (UPS), also known as a continuous power supply (CPS) or battery backup, is a device that maintains a continuous supply of electric power to connected equipment, such as, for example, computers or telecommunications equipment, by supplying power from a separate source when a normal power source (e.g., AC wall outlet) is interrupted or not available. A UPS differs from an auxiliary power supply or standby generator, which does not provide instant protection from a momentary power interruption.

A UPS can be used to provide uninterrupted power to equipment for a certain duration, for example, thirty minutes, until a generator can be turned on or until the normal power source is restored. Integrated systems that have UPS and standby generator components are often referred to as emergency power systems. A UPS system may remain idle until a power failure occurs and then quickly switch from utility power to its own power source, or may continuously power the protected equipment from its energy reserves stored in a battery while simultaneously replenishing its reserves from another power source. When the battery's energy reserves are depleted, or partially drained, the battery will need to be recharged. With batteries that contain a number of serially-connected battery cells, draining and recharging of the battery often results in a voltage imbalance among the cells.

SUMMARY OF THE INVENTION

One embodiment of the present invention is a system for balanced charging of multiple series-connected battery cells. The system includes resistors that are selectably electrically coupled in parallel with respective battery cells among the multiple series-connected battery cells, where the coupling is accomplished through activation and deactivation of respective switches. The system also includes a control unit that is configured to determine a battery cell having a lowest voltage among the battery cells. That battery cell is referred to as the lowest battery cell. The control unit is further configured to activate and deactivate the switches as a function of differences in voltages between the voltage of the lowest battery cell and voltages of each of the other battery cells, where the activation and deactivation of the switches provides balanced charging of the multiple series-connected battery cells.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
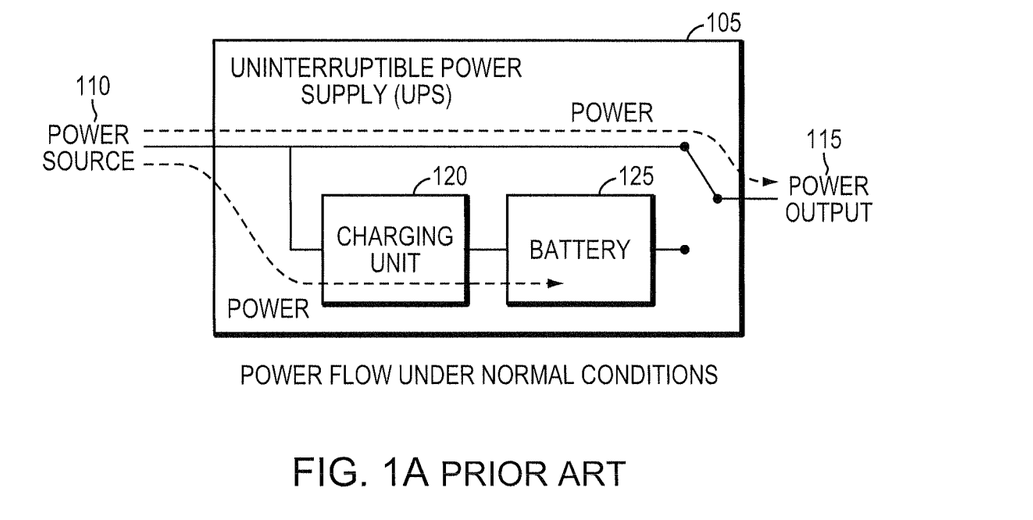
FIGS. 1A and 1B are schematic diagrams illustrating functionality of an Uninterruptible Power Supply (UPS).

FIG. 1A is a schematic diagram illustrating the power flow of an Uninterruptible Power Supply (UPS) 105 under normal conditions (i.e., without a power failure). Normally, the UPS 105 transfers power to a connected device (not shown) without using a battery 125 of the UPS 105 as a source of the power. More specifically, power is transferred from a power source 110, such as a municipal electricity supply, to the UPS 105, and the UPS 105 transfers the power to the connected device (not shown) via a power output 115. The UPS 105 may maintain a sufficient level of power in its battery 125 using a charging unit 120, which obtains power from the power source 110.

Figure 1B:
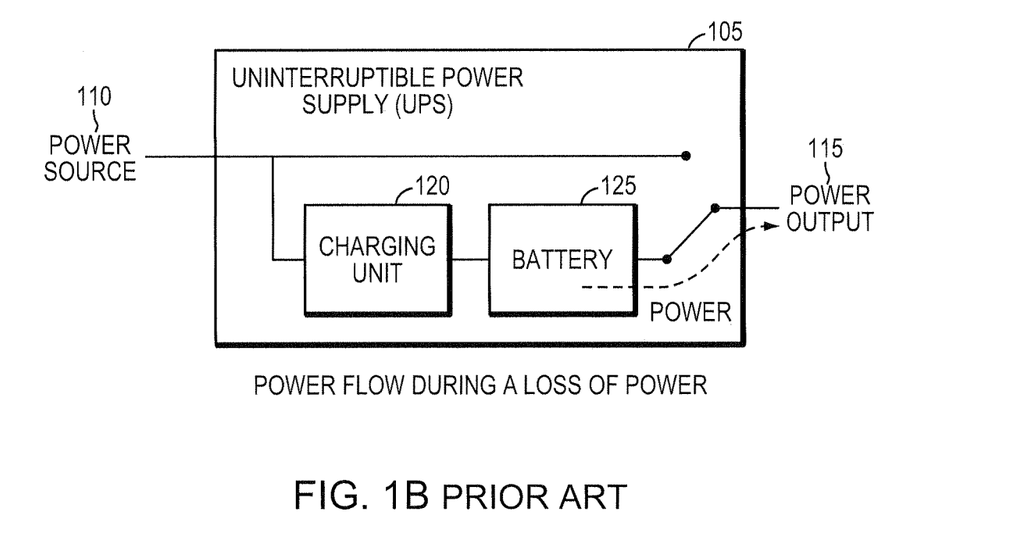

FIG. 1B is a schematic diagram illustrating the power flow of the UPS 105 during a loss of power from the source 110. In an event a power failure occurs with respect to the power source 110, the UPS 105 switches from supplying power to the connected device from the power source 110 to supplying power to the connected device from the battery 125. Once the power source's failure is corrected, the UPS 105 may then switch back to supplying power to the connected device from the power source 110 and may recharge the battery 125. If the battery 125 contains a number of serially-connected battery cells, repeated draining and recharging of the battery 125 often results in a voltage imbalance among the cells.

Differences in voltages among series-connected battery cells can lead to many problems, including premature cell degradation, safety hazards, and reduced battery capacity. Some battery cells with higher voltages, for example, such as voltages that are higher than a manufacturer's suggested limit, may degrade faster as a result of the cells being overcharged. Overcharged cells pose safety hazards, including explosion and fire. To prevent overcharging, many charging systems include a safety protection circuit to terminate charging if any one of the battery cells reaches a certain limit. When cells are unbalanced, such a termination can cause the charging of the other cells to terminate prematurely, resulting in reduced capacity of the battery. A battery with reduced capacity will not provide power for as long as it should, and repeated charging and discharging of the battery may exacerbate the problem, resulting in a reduced life cycle of the battery. Thus, balanced charging of series-connected battery cells can significantly increase the useful life cycle of the battery. The embodiments disclosed herein address this issue of balanced charging.

One embodiment of the present invention is a system for balanced charging of multiple series-connected battery cells. The system includes resistors that are selectably electrically coupled in parallel with respective battery cells among the multiple series-connected battery cells, where the coupling is accomplished through activation of respective switches, and decoupling is accomplished through deactivation of the respective switches. The system also includes a control unit that is configured to determine a battery cell having a lowest voltage among the battery cells ("lowest battery cell"). The control unit is further configured to activate and deactivate the switches as a function of differences in voltages between the voltage of the lowest battery cell and voltages of each of the other battery cells, where the activation and deactivation of the switches provides balanced charging of the multiple series-connected battery cells.

In other embodiments, the control unit may activate or deactivate each of the switches based on respective differences in voltage between the voltage of the determined lowest battery cell and the voltage of each respective battery cell. Such activation or deactivation of each switch may be based on whether the difference in voltage between the determined lowest battery cell and the respective battery cell exceeds a threshold value. In embodiments that activate or deactivate switches based on a threshold value, the control unit may be configured to adjust the threshold value based on trends of voltage differences over time or based on the voltage of the lowest battery cell at any one time. The control unit may also be configured to determine the lowest battery cell and update the activation states of the switches according to a time interval, and may further adjust the time interval dynamically based on trends of voltage differences over time.

The control unit, in some embodiments, may be configured to disable charging of the battery cells in an event any one of the battery cells reaches a maximum voltage limit, or in an event the total voltage of all the battery cells reaches a maximum voltage limit. Embodiments may also include one or more temperature sensors coupled to the control unit and may be configured to disable charging of the battery cells in an event the temperature of any one of the battery cells, or the ambient temperature around the battery cells, exceeds a temperature limit. It should be noted that the control unit may include an analog-to-digital converter, processor, and addressing logic, may be active during at least portion of charging of the battery cells, and may be configured to disable charging of the battery cells during active use of the cells.

Former approaches for balanced battery charging include setting a high voltage limit for the cells of a battery (e.g., 3.4V or 90% of the manufacturer suggested absolute single cell voltage limit), where if any one cell is exceeds the limit, a cell balancing circuit for the cell is turned on to split and reduce the battery charge current for that cell. This approach performs cell balancing on the strongest cells, and after the strongest cell reaches its 100% absolute single cell voltage limit, the charger has to be shut down. At the end of charging, however, the other cells may still not have reached a balanced level.

Embodiments of the present invention overcome the problems of former approaches by using a delta value as balancing "ruler." During charging of the battery cells, differences between the voltages of the cells and the voltage of the lowest cell (i.e., weakest cell) are determined. For each cell, if the voltage difference is higher than the delta value, then the charge current being applied to that cell is reduced. Each time the differences are determined, it may be a different cell that is the weakest cell due to, for example, hardware limitations or random charge current variations.

The delta value voltage limit may be variable and can be changed at various stages to achieve better control and cell balancing. For example, a larger delta may be used at the beginning of the charging process, and smaller delta values may be used as cell voltages increase. This dynamic changing of the delta value during the cell balancing process not only improves cell balance circuit on/off judgment, but also provides greater flexibility in controlling the cell balancing levels based on real-time information. Because the difference in voltages between the cells is continually monitored and compared to the delta value, this approach not only reduces the chance of the cells being unbalanced when charging is complete (e.g., when any one cell reaches an absolute volt limit), but also helps to reduce cell impedance and, as a result, total charging time is reduced. Additionally, this approach may be implemented using a low-end 8-bit microprocessor with a 10-bit A/D channel. When the cell voltage differences are determined, the approach can control the switches by setting a number of "balancing" bits all at once in a register to turn on/off respective balancing circuits. This reduces the impact from a surge reading due to sudden changes in current.

The embodiments of the present invention may also stop the charging process upon detecting battery discharging activities, which prevents an unexpected reverse situation in which more current would be drawn from the weakest cell as compared to the other cells. Additionally, to protect cells from being overcharged, the embodiments may include various "firewalls" that shutdown the charger if, for example, any of the following conditions are met: (1) any one cell reaches an absolute voltage limit, (2) total battery voltage exceeds a certain limit (e.g., number of cells*ideal high limit voltage*1.05), or (3) ambient temperature has reached or exceeded 60 degrees Celsius.

Figure 2A:
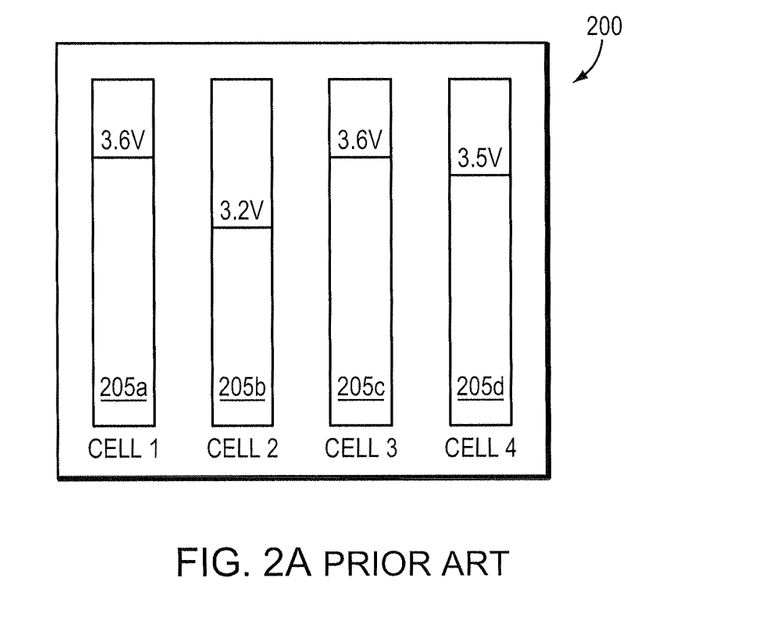
FIG. 2A is a schematic diagram illustrating a battery having four series-connected battery cells, where the voltages of the cells are unbalanced.

FIG. 2A is a schematic diagram 200 illustrating a battery having four series-connected battery cells 205a-d, where the voltages of the cells are unbalanced. According to the particular battery shown, the maximum voltage for a cell of the battery may be, for example, 4.0 volts. Cells 1 and 3 (205a, 205c) have a charge of 3.6 volts, cell 4 (205d) has a charge of 3.5 volts, and cell 2 (205b) has a charge of 3.2 volts. The cells 205a-d are unbalanced, and cell 2 (205b) is the lowest (weakest) cell.

Figure 2B:
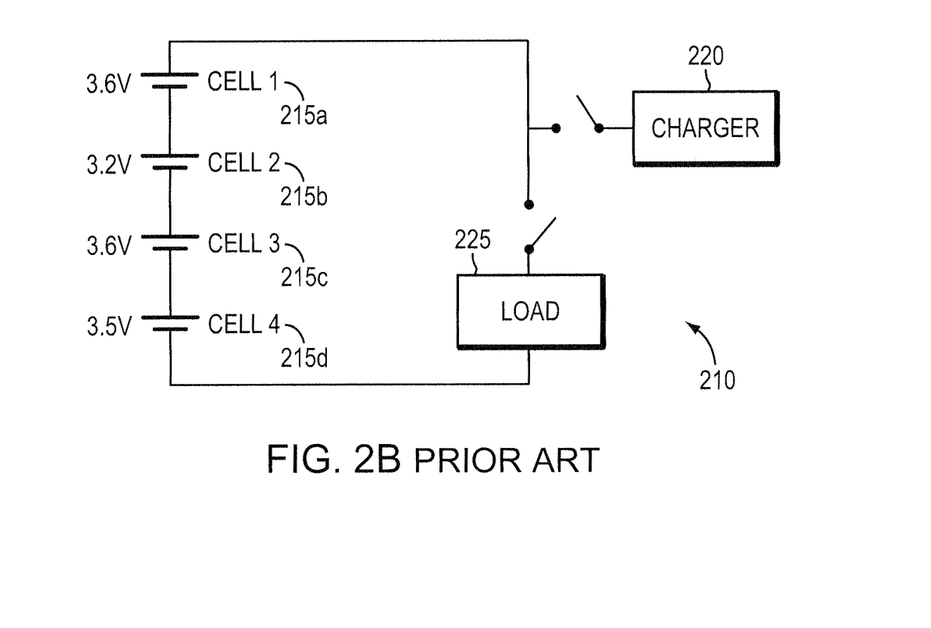
FIG. 2B is a circuit diagram illustrating four series-connected battery cells and a typical charger, where the voltages of the cells are unbalanced.

FIG. 2B is a circuit diagram 210 illustrating four series-connected battery cells 215a-d and a typical charger 220, where the voltages of the cells are unbalanced, such as in FIG. 2A. Also shown is a typical load 225 for the battery.

Figure 3:
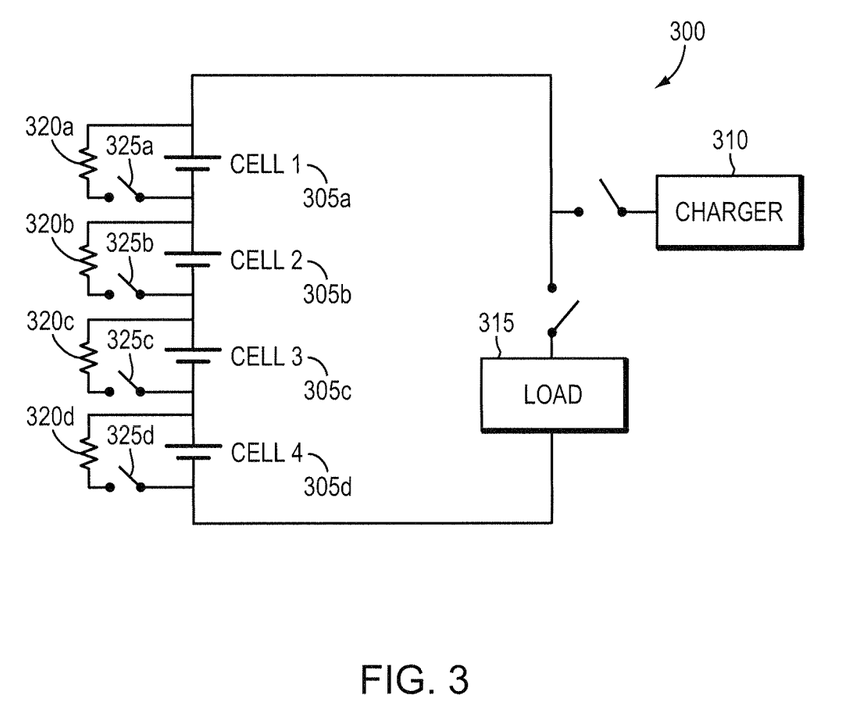
FIG. 3 is a circuit diagram illustrating four series-connected battery cells, a charger, and four resistors that are able to be selectably electrically coupled in parallel with the battery cells.

FIG. 3 is a circuit diagram 300 illustrating four series-connected battery cells 305a-d, a charger 310, and four resistors 320a-d that are able to be selectably electrically coupled in parallel with the battery cells. Four switches 325a-d enable the resistors 320a-d to be electrically coupled to the cells 305a-d. A resistor 320 is coupled to a respective cell 305a-d when the respective switch 325 is closed. When electrically coupled to a cell 305a-d, the respective resistor 320 lessens the voltage applied to the cell 305a-d, resulting in a slower charge for that cell 305a-d.

Figure 4A:
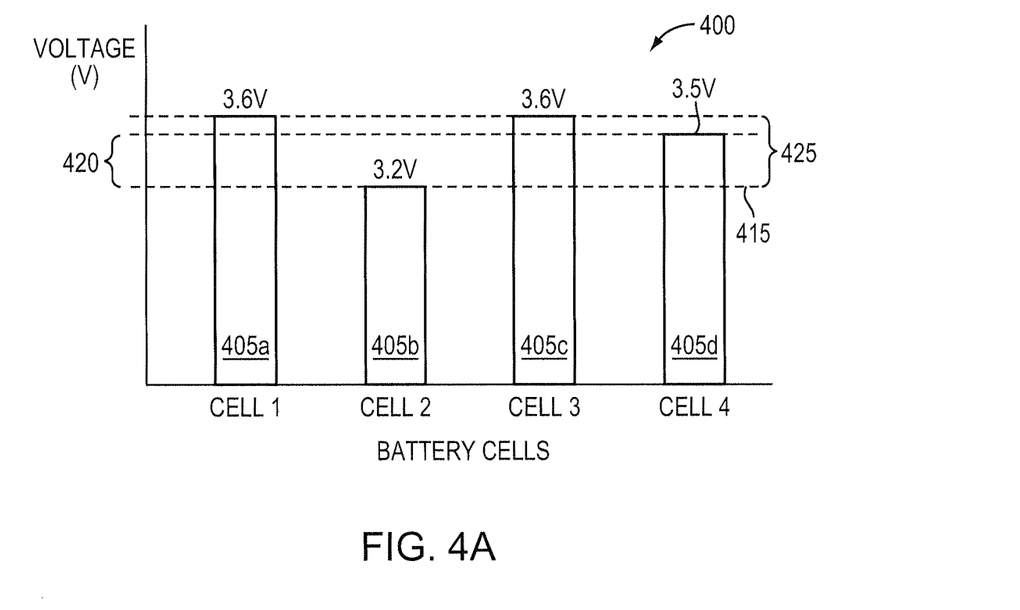
FIG. 4A is a graph illustrating differences in voltages between a voltage of a lowest battery cell and voltages of each of the other battery cells.

FIG. 4A is a graph 400 illustrating differences in voltages between a voltage of a lowest battery cell 405b and voltages of each of the other battery cells 405a, 405c, 405d, according to an embodiment of the present invention. The voltage 415 of the lowest cell 405b is 3.2 volts. The difference between the voltages 420 of the lowest cell 405b and two of the other cells 405a, 405c is 0.4 volts. The difference between the voltages 425 of the lowest cell 405b and the last cell 405d is 0.3 volts.

Figure 4B:
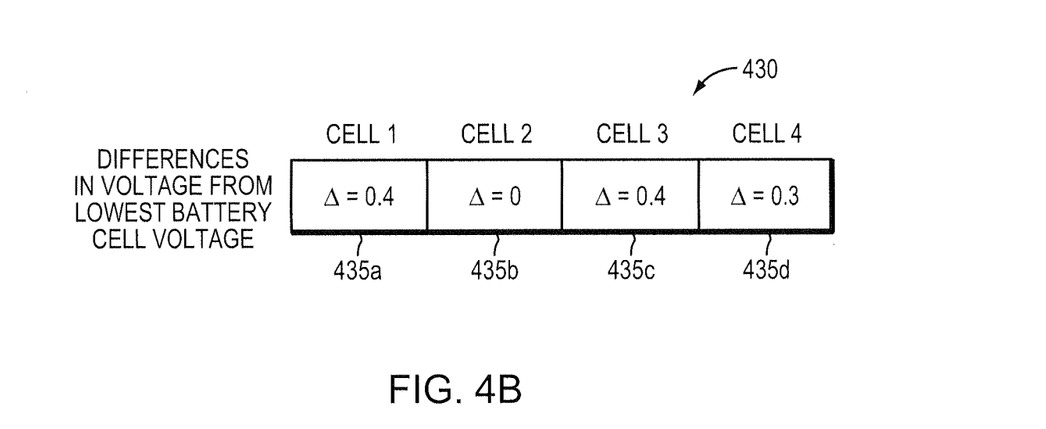
FIG. 4B is a table illustrating differences in voltages between a voltage of a lowest battery cell and voltages of each of the other battery cells.

FIG. 4B is a table 430 illustrating differences in voltages 435a-d between a voltage of a lowest battery cell and voltages of each of the other battery cells, according to an embodiment of the present invention as illustrated in FIG. 4A.

Figure 5A:
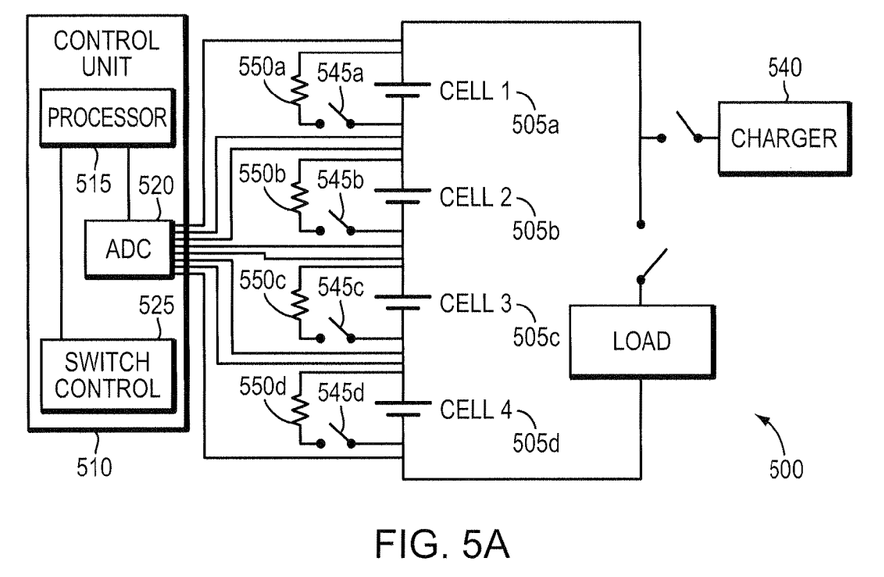
FIGS. 5A and 5B are schematic diagrams illustrating four series-connected battery cells, a charger, four resistors that are able to be selectably electrically coupled in parallel with the battery cells, and a control unit that activates and deactivates switches to provide balanced charging of the battery cells.
Figure 5B:
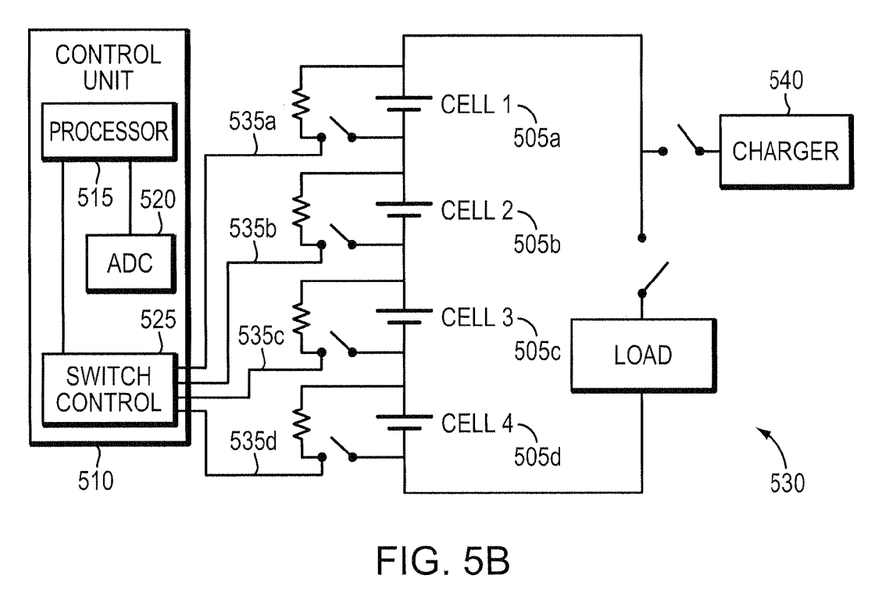

FIGS. 5A and 5B are schematic diagrams 500, 530 illustrating four series-connected battery cells 505a-d, a charger 540, four resistors 550a-d that are able to be selectably electrically coupled in parallel with the battery cells 505a-d, and a control unit 510 that activates and deactivates switches 545a-d to provide balanced charging of the battery cells 505a-d, according to an embodiment of the present invention. The control unit 510 is illustrated as including a processor 515, an analog-to-digital converter (ADC) 520, and a switch controller 525. According to one embodiment, the ADC 520 determines the voltages for each of the battery cells 505a-d using electrical lines connected to the cells 505a-d. The control unit 510 determines a lowest cell from among the cells and determines each cell's difference in voltage from the lowest cell. Based on the differences in voltages, the control unit 510 determines which switches 545a-d to close, that is, for which cells 505a-d to reduce the charging current. The switch controller 525 then activates or deactivates the switches 545a-d, based on the determination, via control lines 535a-d to the switches 545a-d.

Figure 6:
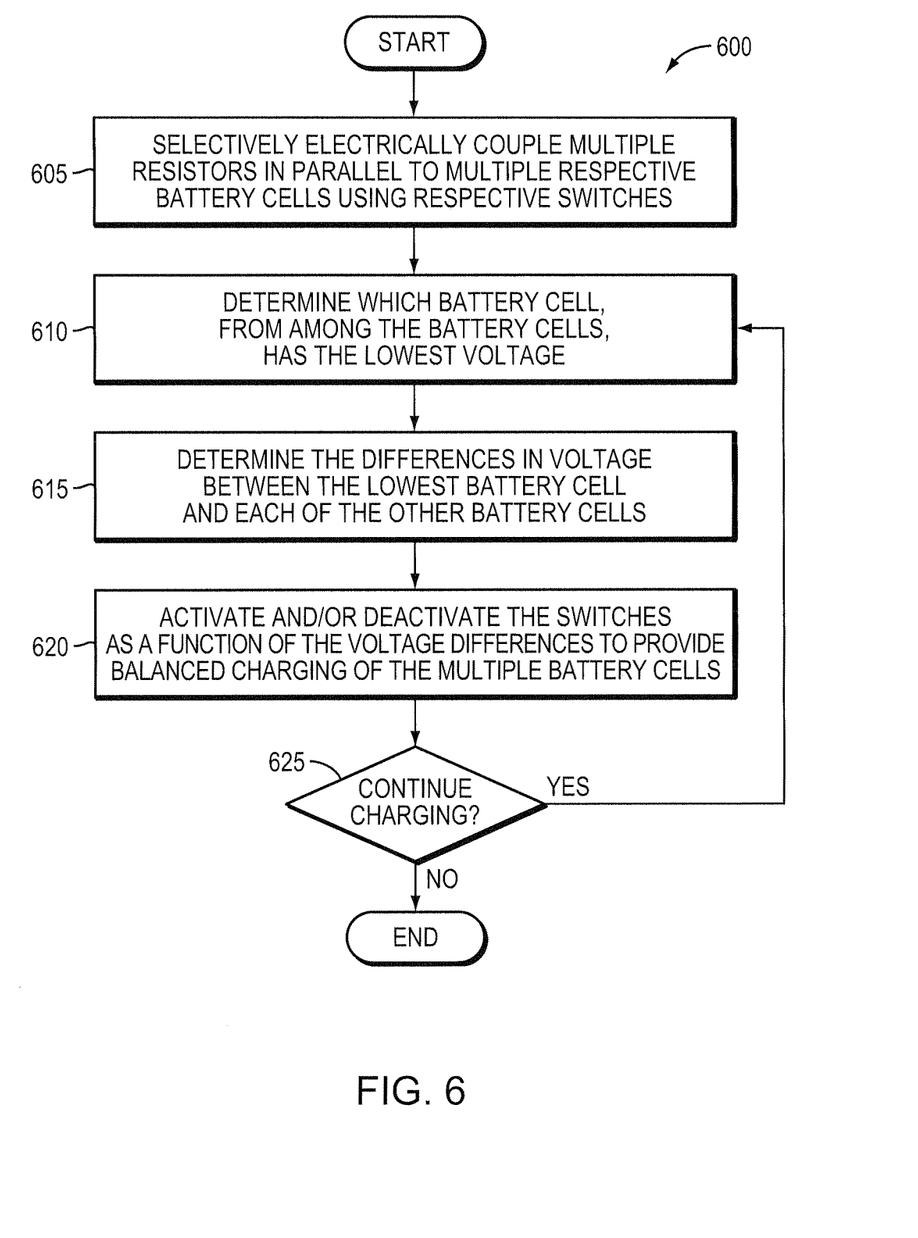
FIG. 6 is a flow diagram illustrating using resistors that are able to be selectably electrically coupled in parallel with respective battery cells to provide balanced charging of the battery cells.

FIG. 6 is a flow diagram 600 illustrating using resistors that are able to be selectably electrically coupled in parallel with respective battery cells to provide balanced charging of the battery cells, according to an embodiment of the present invention. According to the illustrated method, resistors are provided to selectively electrically couple in parallel with respective battery cells using respective switches (605). During charging of the battery cells, it is determined which battery cell has a lowest voltage from among the battery cells (referred to as a "lowest battery cell") (610). Respective differences in voltage between the voltage of the lowest battery cell and voltages of each of the other battery cells is then determined (615), and the switches are activated and deactivated as a function of the differences in voltages (620). The determination of the lowest battery cell, the voltage differences, and the activation and deactivation of the switches may continue throughout the charging of the battery cells (625), resulting in balanced charging of the multiple series-connected battery cells.

FIGS. 7A-7E are graphs 700, 710, 715, 720, 725 illustrating differences in voltages between a voltage of a lowest battery cell and voltages of each of other battery cells at different points in time during balanced charging of the battery cells, according to an embodiment of the present invention.

Figure 7A:
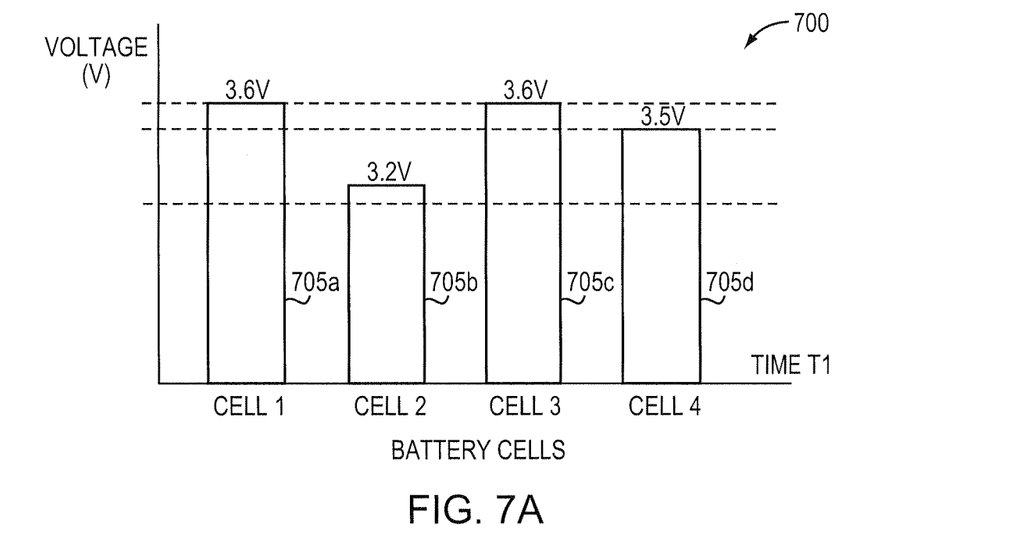
FIGS. 7A-7E are graphs illustrating differences in voltages between a voltage of a lowest battery cell and voltages of each of other battery cells at different points in time during balanced charging of the battery cells.

FIG. 7A shows that, at time T1, cell 2 (705b) is the lowest battery cell with a voltage of 3.2 volts. Cells 1 and 3 (705a, 705c) have voltages that are each 0.4 volts higher than cell 2. Cell 4 (705d) has a voltage that is 0.3 volts higher than cell 2. If the delta voltage limit were to be set to 0.1 volts, for example, then a control unit, or similar device, determines that the switches for cells 1, 3, and 4 are to be activated (closed) because the differences in voltage for those cells are at or above the delta voltage limit. Once the switches for those cells are closed, the respective resistors reduce the amount of charging current applied to those cells.

Figure 7B:
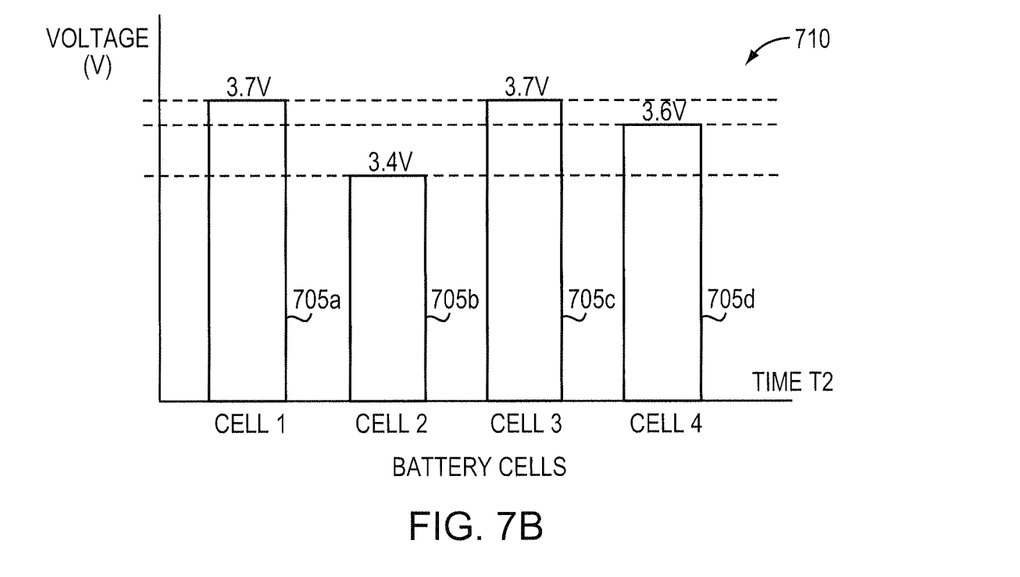

FIG. 7B shows that, at time T2, cell 2 is still the lowest battery cell with a voltage of 3.4 volts. Cells 1 and 3 have voltages that are each 0.3 volts higher than cell 2. Cell 4 has a voltage that is 0.2 volts higher than cell 2. It should be noted that while cell 2 gained 0.2 volts, cells 1, 3, and 4 gained only 0.1 volts due to the reduced amount of charging current applied to those cells. Because the voltage differences for cells 1, 3, and 4 are still at or above the delta voltage limit of 0.1 volts, the control unit determines that the switches for those cells are to remain closed.

Figure 7C:
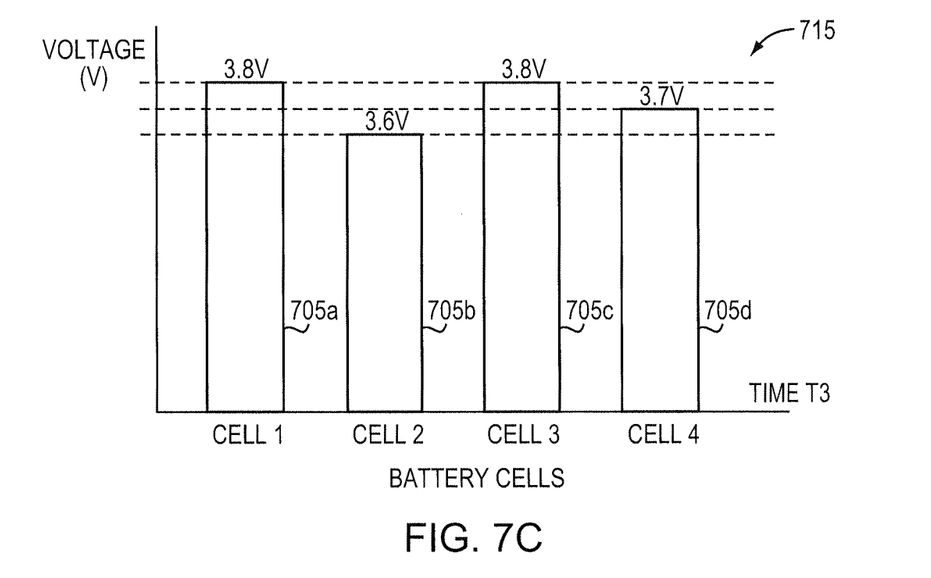

FIG. 7C shows that, at time T3, cell 2 is still the lowest battery cell with a voltage of 3.6 volts. Cells 1 and 3 have voltages that are each 0.2 volts higher than cell 2. Cell 4 has a voltage that is 0.1 volts higher than cell 2. Because the voltage differences for cells 1, 3, and 4 are still at or above the delta voltage limit of 0.1 volts, the control unit determines that the switches for those cells are to remain closed.

Figure 7D:
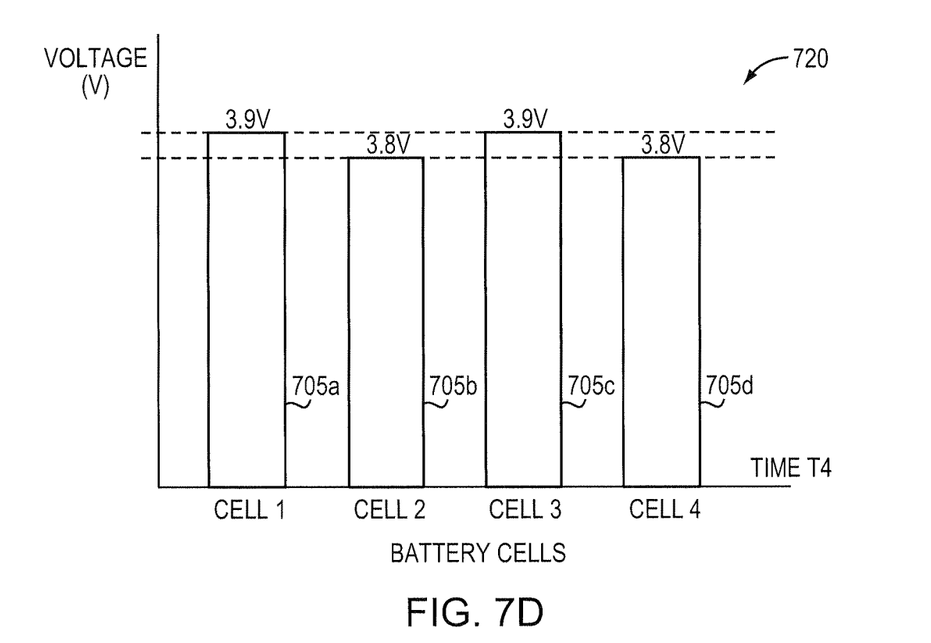
Figure 7E:
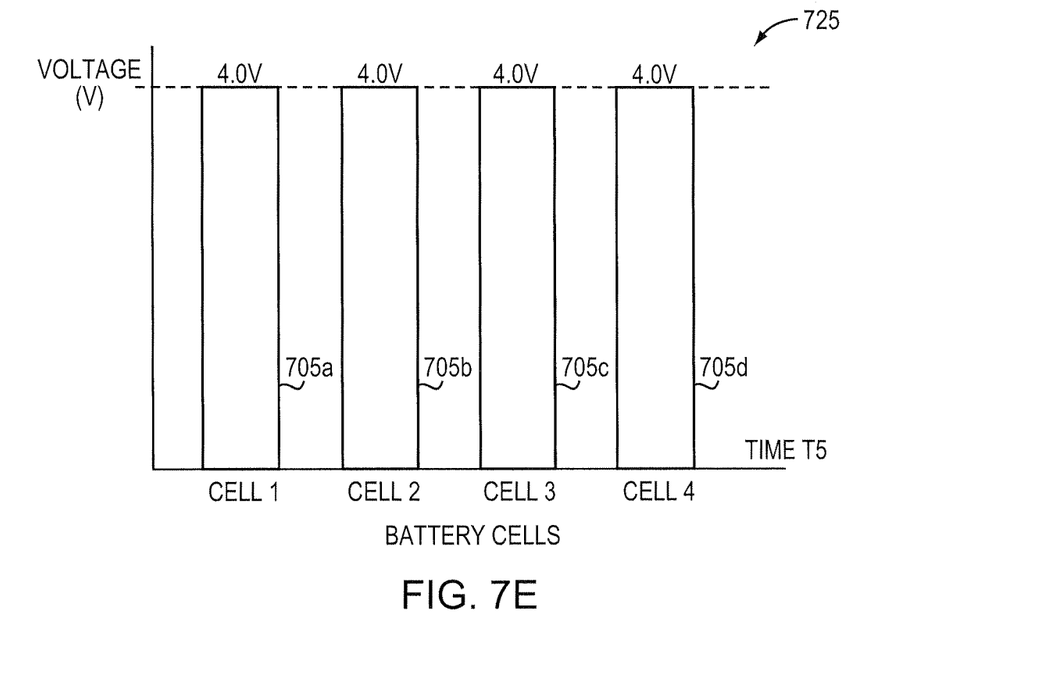

FIG. 7D shows that, at time T4, both cells 2 and 4 are the lowest battery cells, each with a voltage of 3.8 volts. Cells 1 and 3 have voltages that are each 0.1 volts higher than cells 2 and 4. Because the voltage differences for cells 1 and 3 are still at or above the delta voltage limit of 0.1 volts, the control unit determines that the switches for those cells are to remain closed. But because the voltage difference for cell 4 is now below the delta limit, the control unit determines that the switch for cell 4 is to be deactivated (opened).

FIG. 7D shows that, at time T5, all cells have a voltage of 4.0 volts. In the case of this particular battery, 4.0 volts is the maximum voltage for a cell, so the charging of the battery cells is complete. As can seen in FIGS. 7A-7E, the application of an embodiment of the invention for balanced charging results in a battery with unbalanced cells being charged to a state where the battery cells are balanced.

Figure 7F:
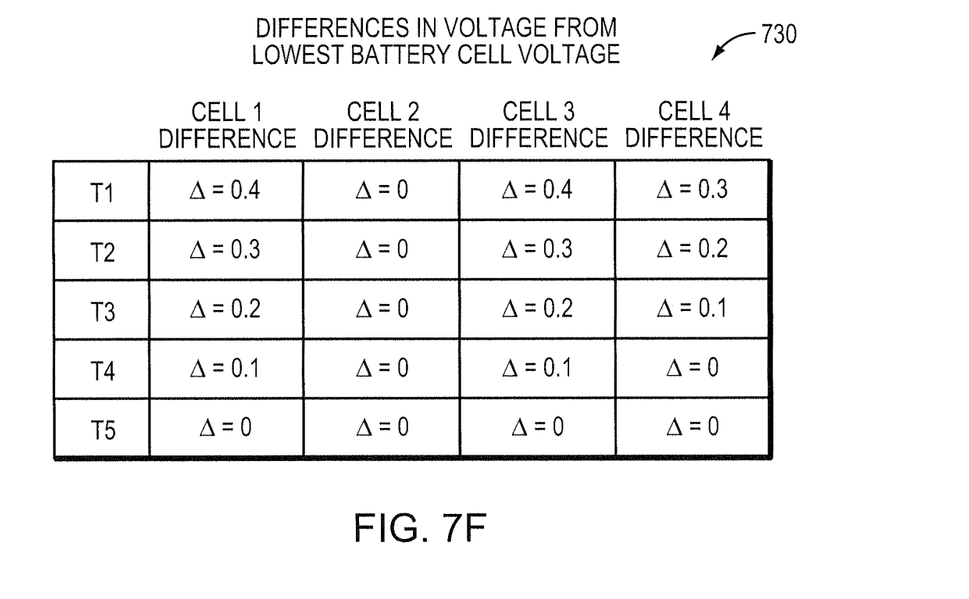
FIG. 7F is a chart illustrating differences in voltages between a voltage of a lowest battery cell and voltages of each of other battery cells at different points in time during balanced charging of the battery cells.

FIG. 7F is a chart illustrating differences in voltages between a voltage of a lowest battery cell and voltages of each of other battery cells at different points in time during balanced charging of the battery cells, according to an embodiment of the present invention as illustrated in FIGS. 7A-7E.

While this invention has been particularly shown and described with references to example embodiments thereof, it will be understood by those skilled in the art that various changes in form and details may be made therein without departing from the scope of the invention encompassed by the appended claims.

It should be understood that the diagrams of FIGS. 3, 5A, 5B, and 8 are examples that can include more or fewer components, be partitioned into subunits, or be implemented in different combinations. Moreover, the flow diagram of FIG. 6 may be implemented in hardware, firmware, or software. If implemented in software, the software may be written in any software language suitable for use in the example systems illustrated in FIGS. 3, 5A, 5B, and 8. The software may be embodied on any form of computer readable medium, such as RAM, ROM, or magnetic or optical disk, and loaded and executed by general purpose or application-specific processor(s).

Figure 8:
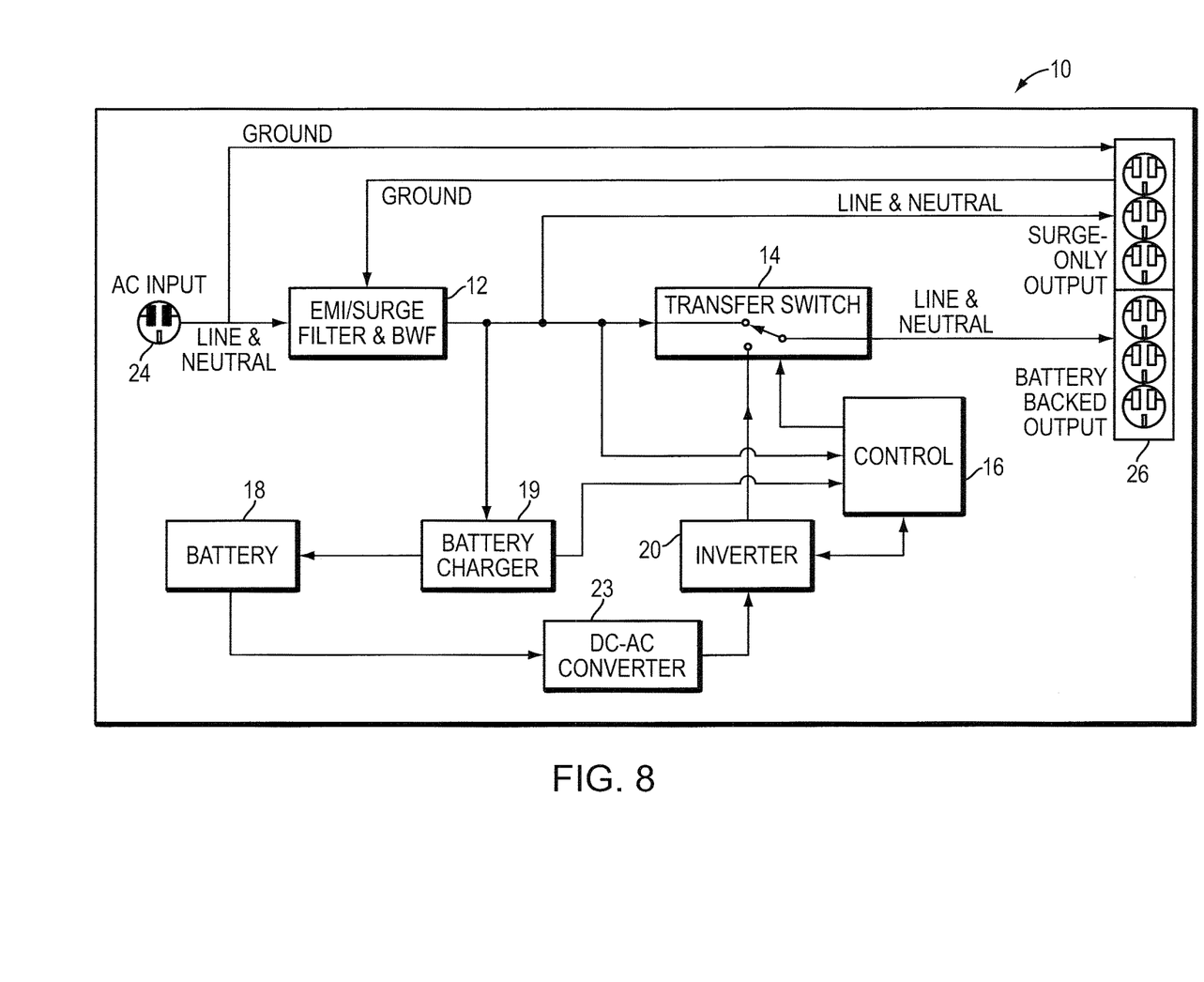
FIG. 8 is a block diagram illustrating a typical UPS system.

The disclosed embodiments can be applied to any UPS topology, such as off-line, line interactive, or double conversion. An example UPS topology is illustrated in FIG. 8. The UPS 10 includes an input filter/surge protector 12, transfer switch 14, controller 16, battery 18, battery charger 19, inverter 20, and DC-AC converter 23. The UPS also includes an input 24 for coupling to an AC power source and an outlet 26 for coupling to a load. The UPS 10 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 20. The controller 16 determines whether the AC power available from the filter/surge protector is within predetermined tolerances and, if so, controls the transfer switch to provide the AC power from the filter/surge protector to the outlet 26. If the AC power from the rectifier is not within the predetermined tolerances, which may occur because of "brown out," "high line," or "black out" conditions, or due to power surges, then the controller controls the transfer switch to provide the AC power from the inverter 20. The DC-AC converter 23 is an optional component that converts the output of the battery to a voltage that is compatible with the inverter. Depending on the particular inverter and battery used, the inverter may be operatively coupled to the battery either directly or through a converter.

The embodiments presented herein are illustrated with respect to such a UPS application, but it should be understood that the embodiments can be applied to other applications with a battery having multiple series-connected battery cells. Further, the embodiments disclosed herein may be used for balanced charging of a battery that contains, for example, four Lithium Iron Phosphate (LiFePO) cells made by a battery manufacturer, such as A123, but is not limited to such LiFePO cells. One of ordinary skill in the art would appreciate that the embodiments disclosed herein may be applied to other kinds of battery cells, or batteries with more or fewer cells, while still achieving good cell balancing results.

What is claimed is:

1. A system for balanced charging of multiple series-connected battery cells, the system comprising:
    resistors being selectably electrically coupled in parallel with respective battery cells, among the multiple series-connected battery cells, through activation and deactivation of respective switches; and
    a control unit configured to determine a battery cell having a lowest voltage among the multiple series-connected battery cells, resulting in a determined lowest battery cell, and configured to activate and deactivate each of the respective switches as a function of a respective difference in voltage between the lowest voltage of the determined lowest battery cell and a respective voltage of each respective battery cell to provide balanced charging of the multiple series-connected battery cells during a charging process, the control unit further configured to activate or deactivate the respective switches by setting a number of balancing bits all at once based on each respective difference in voltage between the lowest voltage of the determined lowest battery cell and each respective voltage of each respective battery cell, the control unit still further configured to activate a respective switch of the respective switches in an event the respective difference in voltage between the lowest voltage of the determined lowest battery cell and the respective voltage of the respective battery cell exceeds a threshold value, wherein the threshold value is a larger threshold value at a beginning of the charging process and a smaller threshold value as cell voltages increase.

2. A system as in claim 1 wherein the control unit is configured to adjust the threshold value based on trends of voltage differences over time.

3. A system as in claim 1 wherein the control unit is configured to adjust the threshold value based on the voltage of the determined lowest battery cell.

4. A system as in claim 1 wherein the control unit is configured to determine the lowest battery cell and update the activation states of the switches according to a time interval.

5. A system as in claim 4 wherein the control unit is further configured to adjust the time interval dynamically based on trends of voltage differences over time.

6. A system as in claim 1 wherein the control unit is configured to disable charging of the battery cells in an event one of the battery cells reaches a first maximum voltage limit or in an event a total voltage of all the battery cells reaches a second maximum voltage limit.

7. A system as in claim 1 further including a temperature sensor coupled to the control unit and configured to disable charging of the battery cells in an event the temperature of at least one of the battery cells or the ambient temperature around the battery cells exceeds a temperature limit.

8. A system as in claim 1 wherein the control unit is configured to disable charging of the battery cells during active use of the battery cells.

9. A system as in claim 1 wherein the control unit is active during a portion of charging of the battery cells.

10. A system as in claim 1 wherein the control unit includes an analog-to-digital converter, processor, and addressing logic.

11. A method of balanced charging of multiple series-connected battery cells, the method comprising:
    selectively electrically coupling resistors in parallel with respective battery cells, among the multiple series-connected battery cells, using respective switches;
    determining a battery cell having a lowest voltage among the multiple series-connected battery cells, resulting in a determined lowest battery cell;
    determining a respective difference in voltage between the lowest voltage of the determined lowest battery cell and a respective voltage of each respective battery cell; and
    activating and deactivating the respective switches as a function of each respective difference in voltage to provide balanced charging of the multiple series-connected battery cells during a charging process, wherein activating and deactivating the respective switches includes:
        activating or deactivating each of the respective switches by setting a number of balancing bits all at once based on each respective difference in voltage between the lowest voltage of the determined lowest battery cell and each respective voltage of each respective battery cell; and
        activating a respective switch of the respective switches in an event the respective difference in voltage between the lowest voltage of the determined lowest battery cell and the respective voltage of the respective battery cell exceeds a threshold value, wherein the threshold value is a larger threshold value at a beginning of the charging process and a smaller threshold value as cell voltages increase.

12. A method as in claim 11 further including adjusting the threshold value based on trends of voltage differences over time.

13. A method as in claim 11 further including adjusting the threshold value based on the voltage of the determined lowest battery cell.

14. A method as in claim 11 wherein determining the lowest battery cell, determining the respective differences in voltage, and activating and deactivating the switches occur according to a time interval.

15. A method as in claim 14 further including dynamically adjusting the time interval based on trends of voltage differences over time.

16. A method as in claim 11 further including disabling charging of the battery cells in an event one of the battery cells reaches a first maximum voltage limit or in an event a total voltage of all the battery cells reaches a second maximum voltage limit.

17. A method as in claim 11 further including:
measuring a temperature of at least one of the battery cells or the ambient temperature around the battery cells; and
disabling charging of the battery cells in an event the temperature of at least one of the battery cells or the ambient temperature around the battery cells exceeds a temperature limit.

18. A method as in claim 11 further including disabling charging of the battery cells during active use of the battery cells.

19. A system for balanced charging of multiple series-connected battery cells, the system comprising:
means for selectably electrically coupling resistors in parallel to respective battery cells;
means for determining a battery cell having a lowest voltage among the multiple series-connected battery cells, resulting in a determined lowest battery cell;
means for determining respective voltage differences between the lowest voltage of the determined lowest battery cell and each respective voltage of each respective battery cell; and
means for adjusting currents applied to the battery cells all at once during charging as a function of the respective voltage differences determined and a threshold value to provide balanced charging of the multiple series-connected battery cells, wherein the threshold value is a larger threshold value at a beginning of the charging process and a smaller threshold value as cell voltages increase.

20. A system as in claim 1 wherein the number of balancing bits are set all at once in a register to turn on or off respective balancing circuits reducing impact from a surge reading due to sudden changes in current.

* * * * *